United States Patent [19]

Gostomski et al.

[11] 4,283,073
[45] Aug. 11, 1981

[54] BALL TYPE GOOSENECK HITCH

[75] Inventors: John J. Gostomski, Omaha, Nebr.; Arnold R. Gostomski, Arlington, Tex.; Eugene F. Dauel, Malmo, Nebr.

[73] Assignee: Atwood Vacuum Machine Company, Rockford, Ill.

[21] Appl. No.: 82,702

[22] Filed: Oct. 9, 1979

[51] Int. Cl.³ .............................................. B60D 1/06
[52] U.S. Cl. .................................... 280/508; 280/513
[58] Field of Search ................... 280/423 R, 510, 509, 280/508, 513, 512, 511, 433, 434

[56] References Cited

U.S. PATENT DOCUMENTS

| 2,521,391 | 9/1950 | Meents | 280/510 |
| 3,659,876 | 5/1972 | Melton | 280/423 R |
| 3,893,713 | 7/1975 | Ivy | 280/423 R |

FOREIGN PATENT DOCUMENTS

| 655069 | 1/1938 | Fed. Rep. of Germany | 280/508 |
| 816286 | 8/1937 | France | 280/513 |

Primary Examiner—John A. Pekar
Attorney, Agent, or Firm—Leydig, Voit, Osann, Mayer & Holt, Ltd.

[57] ABSTRACT

A ball coupler assembly for a gooseneck hitch is described for attachment to a truck having an upstanding coupler ball mounted thereon which extends upwardly from the bed of the truck. The hitch assembly of this invention is secured to the lower end of an adjustable jack at the forward end of the trailer or the like. The hitch comprises a support member having a ramp-like guide at the forward end thereof adapted to guide the coupler ball into coupling position. A coupler is mounted on the support member and extends upwardly therefrom and has an open lower end adapted to receive the coupler ball therein. A slide member is slidably mounted on the support member below the coupler opening and is movable between forward, intermediate and rearward positions. A locking mechanism is mounted on the support member and permits the slide to be moved rearwardly with respect to the hitch so that the coupler ball may be received within the coupling. The locking mechanism also locks the slide member in a locked or forward position to prevent the coupler ball from moving from the coupler.

10 Claims, 7 Drawing Figures

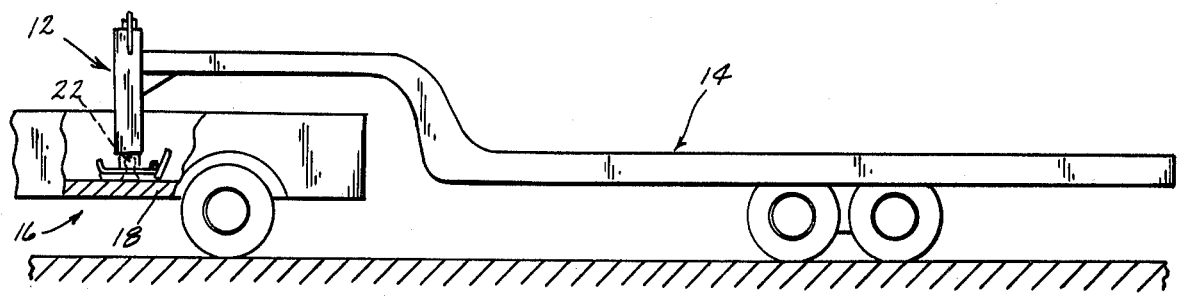
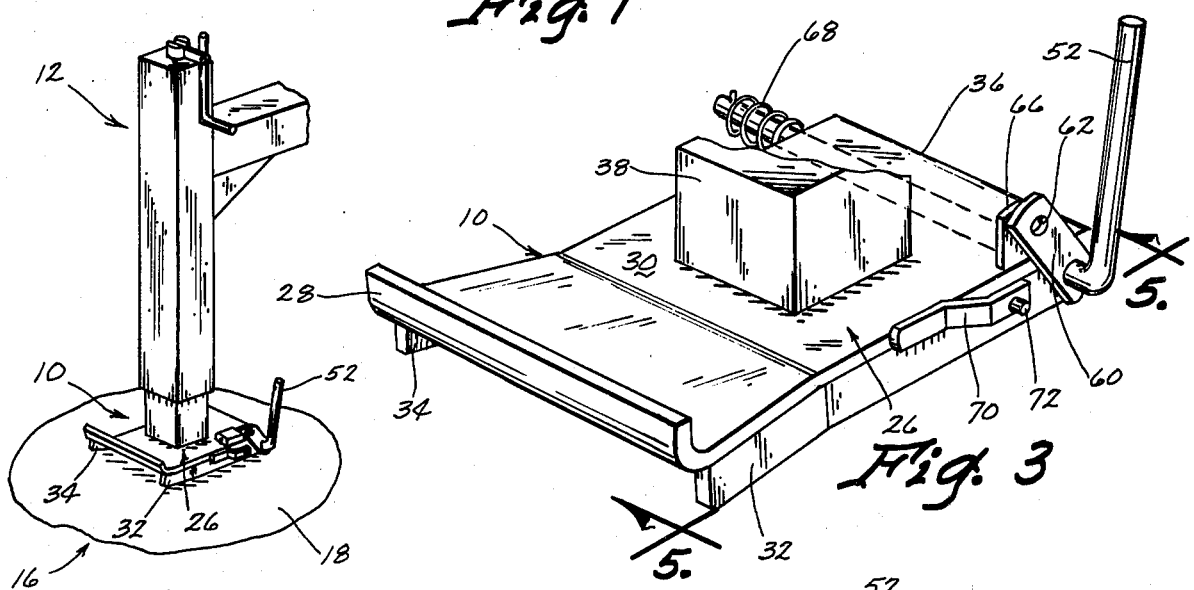
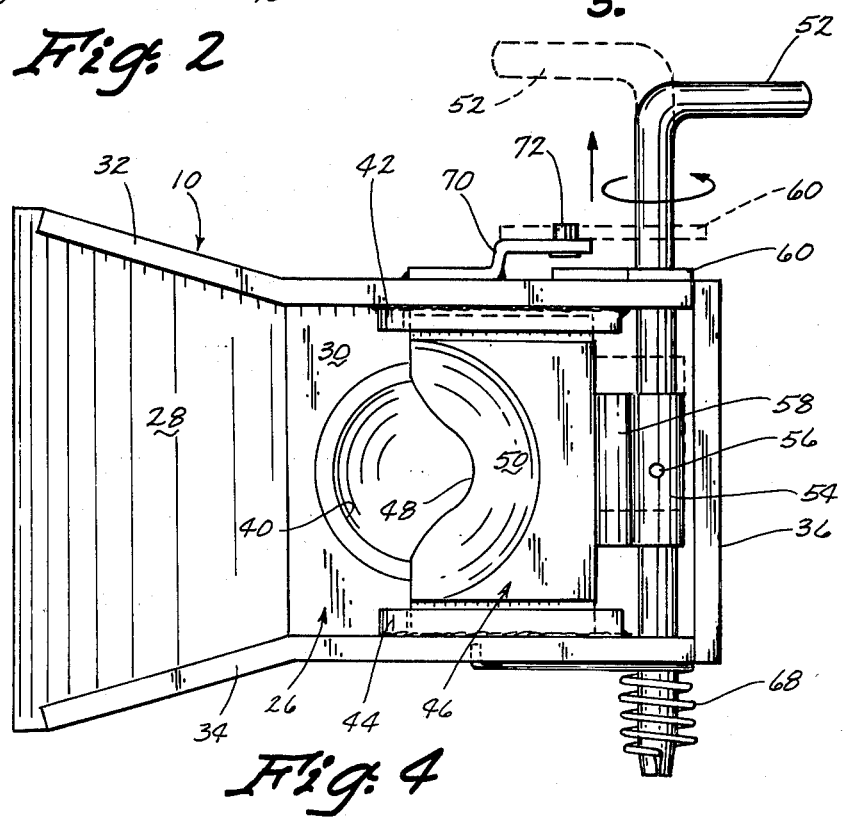

BALL TYPE GOOSENECK HITCH

BACKGROUND OF THE INVENTION

This invention relates to a gooseneck hitch and more particularly to a gooseneck hitch of the ball type which includes automatic locking means.

Gooseneck trailers or the like normally have an adjustable jack or support which extends downwardly from the forward end of the trailer. A hitch means is normally provided on the lower end of the adjustable jack for connection to a coupler ball mounted on the floor or bed of a truck. The coupling of the coupler ball to the hitch is fairly difficult inasmuch as the coupler ball must be precisely aligned with the hitch to insure the coupling thereof. Some hitch arrangements provided on the gooseneck trailers require that the coupler ball initially be precisely positioned with the adjustable jack then being lowered onto the coupler ball with some sort of manual locking operation then being accomplished. The coupling operation therefore becomes quite difficult and time-consuming.

Therefore, it is a principal object of the invention to provide a gooseneck hitch including a guide ramp which permits quick and easy hitching operations.

A still further object of the invention is to provide a gooseneck hitch of the ball type which includes an automatic positive locking mechanism.

A still further object of the invention is to provide a gooseneck hitch including security means to prevent trailer theft.

A still further object of the invention is to provide a gooseneck hitch which permits the trailer to be connected and disconnected from a truck at any angle up to 90°.

A still further object of the invention is to provide a gooseneck hitch which positively maintains the hitch on the coupler ball.

A still further object of the invention is to provide a ball type gooseneck hitch which is economical of manufacture and durable in use.

These and other objects will be apparent to those skilled in the art.

BREIF DESCRIPTION OF THE DRAWINGS

FIG. 1 is a side view illustrating the hitch of this invention mounted on a gooseneck trailer:

FIG. 2 is a partial front perspective view of the hitch of this invention mounted on a coupler ball extending upwardly from the truck bed:

FIG. 3 is a front perspective view of the hitch:

FIG. 4 is a bottom view of the hitch:

SUMMARY OF THE INVENTION

Figure 5:
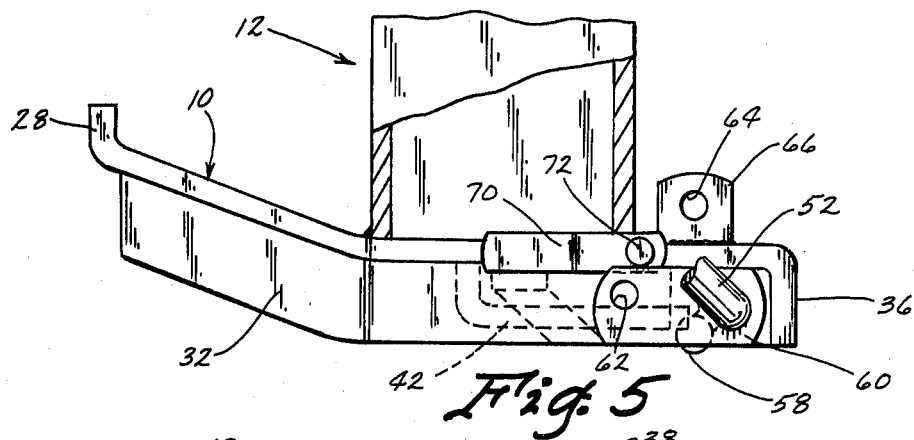
FIG. 5 is a sectional view seen on lines 5—5 of FIG. 3.

A ball type gooseneck hitch is disclosed including a support member having a guide means at the forward end thereof adapted to guide the coupler ball into coupling position. A slide member is slidably mounted on the support member and is movable between forward, intermediate and rearward positions. A locking means is mounted on the support member and is movable between locked and unlocked positions. The slide member, when in its forward position, has its forward end disposed beneath a coupler mounted on the support member so that the forward end of the slide member maintains the coupler ball in the coupler. The locking means selectively maintains the slide member in its forwardmost position. The locking means yieldably maintains the slide member in its intermediate position so that engagement of the coupler ball therewith during the coupling operation causes the slide member to move rearwardly from its intermediate position thereby exposing the lower end of the coupler to permit the coupler ball to move upwardly thereinto. The yieldable means automatically moves the slide member to its forward position after the coupler ball has moved into the coupler. The yieldable means also automatically moves the locking means to its locked position after the coupler ball has moved into the coupler.

DESCRIPTION OF THE PREFERRED EMBODIMENT

The numeral 10 refers generally to the hitch or ball coupler assembly of this invention which is mounted on the lower end of an adjustable jack 12 or support extending downwardly from the forward end of a trailing vehicle or trailer 14 generally described as being of the gooseneck-type. Truck or towing vehicle 16 includes a bed 18 having an upstanding coupler ball 20 mounted thereon. For purposes of description, ball 20 will be described as having a ball portion 22 and a reduced diameter or shank portion 24.

Hitch 10 comprises a support member or mounting plate 26 having a forward end portion 28 which extends upwardly and forwardly from the forward end of base portion 30 of plate 26 as illustrated in the drawings. Guide bars 32 and 34 are secured to plate 26 and extend downwardly from the lower end thereof. Bar 36 extends downwardly from the rearward end of base portion 30 and is secured to the rearward ends of the guide bars 32 and 34.

Figure 6:
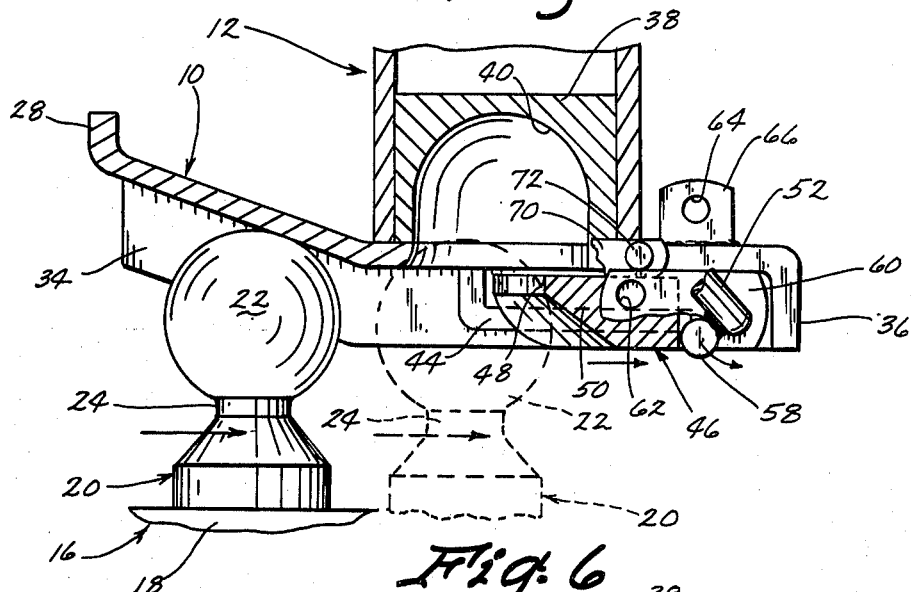
FIG. 6 is a sectional view similar to FIG. 5 illustrating the coupling operation.
Figure 7:
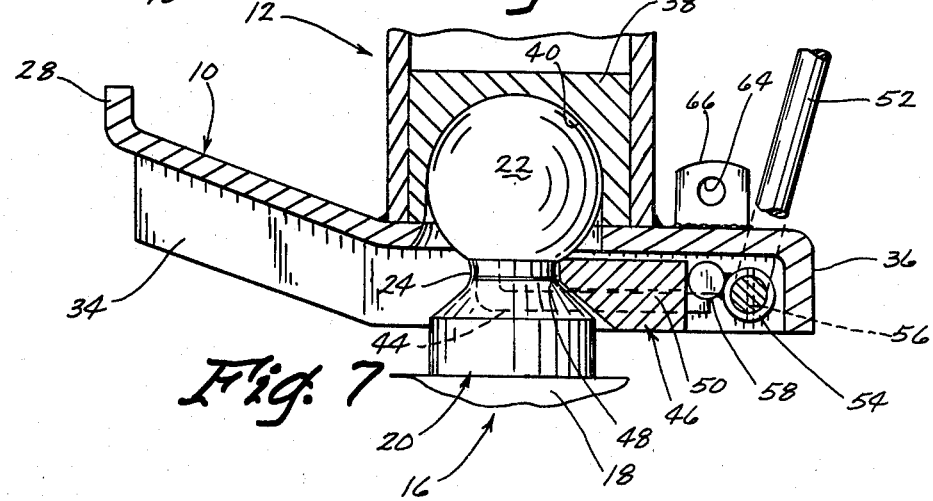
FIG. 7 is a sectional view similar to FIGS. 5 and 6 but which illustrates the coupler ball being received by the hitch.

Coupler 38 is mounted on the upper surface of base portion 30 and extends upwardly therefrom. Coupler 38 has an opening or socket 40 formed therein which has a configuration corresponding to the ball portion 22 as best seen in FIG. 6. Coupler 38 is received by the lower end of the jack 12 as illustrated in FIGS. 5-7. Slide stops 42 and 44 are mounted on the inside surfaces of guide bars 32 and 34 respectively and have a slide 46 slidably mounted thereon. Slide 46 is provided with an arcuate cut-away portion 48 at its forward end and a tapered portion 50 extending downwardly and rearwardly therefrom. Slide 46 is movable from the forward position of FIGS. 4 and 7 to intermediate and rearward positions as will be described in more detail hereinafter.

Handle 52 rotatably extends through guide bars 32 and 34 rearwardly of slide 46 and has a locking tube 54 mounted thereon for rotation therewith by means of drive pin 56. Locking rod 58 is welded to locking tube 54 and is positioned generally forwardly thereof. Handle 52 is movable from the locked position of FIGS. 3, 4 and 7 to the coupling position of FIG. 5. As indicated by the arrow in FIG. 6, the handle 52 may be rotated in a counterclockwise direction from the coupling position to enable the slide 46 to move to its rearward position so that the lower end of the coupler 38 is sufficiently exposed to permit the coupler ball 20 to move upwardly into the opening 40.

Tab 60 is secured to handle 52 and has an opening 62 formed therein which is adapted to register with opening 64 in the tab 66 which is secured to plate 26 and which extends upwardly therefrom. The openings 62 and 64 register when handle 52 is in its locked position so that a padlock or the like may be extended therethrough for security purposes. Spring 68 is operatively secured to handle 52 and guide bar 34 to yieldably urge the handle 52 to its locked position. As indicated by the broken lines in FIG. 4, handle 52 is also longitudinally movable with respect to the mounting plate. Arm 70 is secured to plate 26 as illustrated in the drawings and extends rearwardly and outwardly therefrom. Rivet 72 extends laterally outwardly from the rearward end of the arm 70.

The method of connecting the trailer 14 to the coupler ball 20 on the truck 16 is as follows. The trailer 14 would initially be supported in some fashion by jacks, stands or the like so that hitch 10 is spaced above the ground. The truck 16 is then backed towards the hitch 10 in customary fashion. It should be noted that the stands or jacks for the trailer 14 would be adjusted so that the hitch 10 is positioned slightly below the upper end of the coupler ball 22. As the truck 16 is moved rearwardly with respect to the trailer 14, coupler ball 22 engages the forward end of the mounting plate and causes the hitch to move upwardly or causes the bed of the truck to be moved downwardly with respect thereto depending upon the weight of the trailer. The forward end of the mounting plate and the guide bars 32 and 34 act as a guide means or ramp so that the coupler ball 22 is properly positioned with respect to the hitch.

It should be noted that handle 52 is initially positioned in the position of FIG. 3. To achieve the position of FIG. 5, handle 52 is first rotated counterclockwise until tab 62 clears the lower end of arm 70. Handle 52 is then moved longitudinally so that tab 60 is moved outwardly with respect to guide bar 32 and so that tab 60 is positioned outwardly of the rearward end of arm 70. Handle 52 is then rotated clockwise until tab 60 is in engagement with the rivet 72. In other words, the handle 52 is rotated in a counterclockwise direction from the position of FIG. 3 until the tab 60 is positioned below arm 70. Handle 52 is then moved laterally with respect to the hitch so that tab 60 is moved outwardly from guide bar 32 and is positioned outwardly of the rearward end of arm 70. Handle 52 is then rotated in a clockwise direction until tab 60 engages the underside of rivet 72 as illustrated in FIG. 5. With the handle 52 in the position of FIG. 5, the slide 46 will either be in its forward or intermediate positions. As coupler ball 22 moves rearwardly with respect to the hitch 10, the coupler ball 22 engages the forward portion of the slide 46 and moves the slide rearwardly into engagement with the locking rod 58. Continued rearward movement of the coupler ball 22 causes the slide 46 to move the rod 58 downwardly and rearwardly from the position of FIG. 5 in the direction of the arrow illustrated in FIG. 6 so that slide 46 is moved to its rearwardmost position. The downward and rearward movement of the rod 58 and the counterclockwise movement of the handle 52 causes the tab 60 to be moved downwardly from engagement with the rivet 72. As soon as tab 60 has moved below the lower end of the arm 70, spring 68 causes handle 52 to longitudinally move with respect to the hitch so that tab 60 moves towards guide bar 32.

The engagement of the coupler ball 22 with the forward end of the slide 46 continues until slide 46 has moved sufficiently rearward so that the lower end of the opening 40 is sufficiently exposed to permit coupler ball 22 to move upwardly into the opening 40. The stands or jacks on the trailer 14 are then moved to cause the forward end of the trailer 14 to move downwardly with respect to the truck so that coupler ball 22 is positioned in the coupler 38 as illustrated in FIG. 7. Movement of the coupler ball 22 into the opening 40 permits the slide 46 to move forwardly so that the cut-away portion 40 partially embraces the shank portion 24 of the coupler ball as illustrated in FIG. 7. The forward movement of the slide 46 is caused by the spring 68 which rotatably moves the handle 52 clockwise to the position of FIG. 7. When the handle 52 is in the locked position of FIG. 7, slide 46 cannot move rearwardly due to the engagement of its rearward end with the locking rod 58 and its relationship to the locking tube 54. The tapered portion 50 is provided to create sufficient clearance between the slide 46 and the lower portion of the coupler ball to compensate for relative movement between the truck and the trailer. When the components are in the coupled position of FIG. 7, a padlock or the like may be inserted through the openings in the tabs 60 and 66 as previously described. It should also be noted that the relative position of the handle 52 when the hitch is in the position of FIG. 7 tends to prevent counterclockwise rotation of the handle 52 which would permit the slide 46 to move rearwardly. In some situations, it may not be necessary to provide the spring 68 but the preferred embodiment utilizes spring 68.

When it is desired to uncouple the trailer from the truck, the stands or jacks on the trailer 14 would be lowered into ground engagement. The handle 52 is then rotated from the position of FIG. 7 and pulled outwardly with respect to the hitch to permit it to be positioned in the position of FIG. 5. The stands or jacks on the trailer 14 are then further extended and the upward movement of the jack 12 causes the ball 22 to be moved downwardly from the opening 40. The engagement of the ball 22 with the forward end of the slide 46 during this operation causes the slide 46 to move rearwardly so that the ball 22 may be completely removed or withdrawn from the opening 40. When the ball 22 is completely withdrawn from the opening 40, the truck may be moved forwardly to complete the uncoupling operation.

Thus it can be seen that a novel hitch has been provided which permits the automatic coupling of a trailer or the like to a coupler ball mounted on a prime mover such as a truck or the like. The hitch of this invention not only serves to guide the coupler ball into the proper position but also permits the coupling operation to be completed in an efficient and convenient manner. Thus, the hitch of this invention accomplishes at least all of its stated objectives.

We claim:
1. In combination,
a wheeled vehicle having forward and rearward ends, said wheeled vehicle having a support member extending downwardly from the forward end thereof,
a hitch means secured to the lower end of said support member,
a prime mover having an upstanding coupler ball mounted thereon for coupling connection to said hitch means,
said hitch means comprising a substantially horizontally disposed support member, a coupler mounted on said support member and extending upwardly therefrom and having an open lower end, said coupler adapted to receive the coupler ball therein, a slide member slidably mounted below said support member and being movable between forward, intermediate and rearward positions relative to said support member, a locking means mounted on said support member and being movable between locked and unlocked positions, said slide member, when in its said forward position, having a forward end disposed beneath said coupler so that said forward end maintains the coupler ball in said coupler, said slide member, when in its said rearward position, permitting said coupler ball to move upwardly into said coupler, said slide member, when in its said intermediate position, being positioned intermediate said forward and rearward positions, said locking means engaging said slide member and maintaining said slide member in said forward position when said locking means is in said locked position and permitting said slide member to move rearwardly from said forward position when said locking means is in said unlocked position so that engagement of the coupler ball with said slide member during the coupling operation will cause said slide member to move rearwardly from its forward and intermediate positions to expose the lower end of said coupler and permit the coupler ball to move thereinto, yieldable means connected to said locking means and acting on said slide member through said locking means to yieldably maintain said slide member in said intermediate position when said locking means is in said unlocked position, said yieldable means acting on said locking means and acting on said slide member through said locking means to automatically move said locking means to said locked position and to automatically move said slide member to said forward position after said coupler ball has moved into said coupler.

2. In combination,
a wheeled vehicle having forward and rearward ends, said wheeled vehicle having a support member at the forward end thereof, a hitch means secured to said support member for coupling connection to a prime mover having an upstanding coupler ball mounted thereon, said hitch means comprising a substantially horizontally disposed support member having a coupler mounted thereon which extends upwardly therefrom and which has an open lower end, said coupler adapted to receive the coupler ball therein, a slide member slidably mounted below said support member and being movable between forward, intermediate and rearward positions relative to said coupler, a locking means mounted on said support member and being movable between locked and unlocked positions, said slide member, when in its said forward position, having a forward end disposed beneath said coupler lower end so that said forward end will maintain said coupler ball in said coupler, said slide member, when in its said rearward position, permitting said coupler ball to move upwardly into said coupler, said slide member, when in its said intermediate position, being positioned intermediate said forward and rearward positions, said locking means engaging said slide member and maintaining said slide member in said forward position when said locking means is in said locked position and permitting said slide member to move rearwardly from said forward position when said locking means is in said unlocked position so that engagement of the coupler ball with said slide member during the coupling operation will cause said slide member to move rearwardly from its forward and intermediate positions to expose the lower end of said coupler and permit the coupler ball to move thereinto, actuator means connected to said locking means and acting on said slide member through said locking means to yieldably maintain said slide member in its said intermediate position when said locking means is in said unlocked position.

said actuator means acting on said locking means and acting on said slide member through said locking means to automatically move said locking means to said locked position and to automatically move said slide member to said forward position after said coupler ball has moved into said coupler.

3. The combination of claim 2 wherein said actuator means comprises a yieldable means.

4. The combination of claim 2 wherein a guide ramp means is mounted on said support member for guiding the coupler ball into position relative to said coupler during the coupling operation.

5. The combination of claim 2 wherein the forward end of said support member has an upwardly extending ramp portion and wherein a pair of spaced side guides extend downwardly from said support member on opposite sides of said coupler to define a ramp guide means.

6. In combination,
a wheeled vehicle having forward and rearward ends, said wheeled vehicle having a support member at the forward end thereof, a hitch means secured to said support member, a prime mover having an upstanding coupler ball mounted thereon for coupling connection to said hitch means, said hitch means comprising a substantially horizontally disposed support member, a coupler mounted on said support member and extending upwardly therefrom and having an open lower end, said coupler adapted to receive the coupler ball therein, a slide member slidably mounted below said support member and being movable between forward, intermediate and rearward positions relative to said support member, a shaft operatively rotatably mounted on said support member rearwardly of said slide member and being disposed transversely with respect to said slide member, said shaft being selectively movable between first, second and third rotational positions, said shaft being normally positioned in said first position, said shaft having an actuator element mounted thereon for rotation therewith, said actuator element being offset with respect to the rotational axis of said shaft, said actuator element being positioned between said shaft and the rearward end of said slide member when said shaft is in its first position to prevent the rearward movement of said slide member thereby maintaining the coupler ball in said coupler, said actuator element being positioned below the axis of said shaft when said shaft is in its third position to permit said slide member to move rearwardly to expose the lower end of said coupler, means for selectively maintaining said shaft in its said second position during the initial stages of the coupling operation whereby engagement of the coupler ball with the forward end of said slide member will move said slide member rearwardly and rotate said shaft from its second position to its third position, and means for automatically returning said shaft to its first position after said coupler ball has moved into said coupler.

7. Apparatus for hitching a trailing vehicle to a towing vehicle, said towing vehicle having an upstanding coupler ball adjacent its rear end, said apparatus comprising a substantially horizontally disposed support member adapted for attachment to the forward end portion of the trailing vehicle, a coupler on said support member and defining a downwardly opening socket adapted to receive said ball, a slide mounted on said support member beneath said socket to move between a forward coupling position and a rearward released position, said slide, when in said release position, being located rearwardly of said socket in a position to permit said ball to enter said socket and, when in said coupling position, engaging said ball to retain the ball in said socket, locking means mounted on said support member to move between locked and unlocked positions and being operable when in said locked position to hold said slide forwardly in said coupling position, said locking means being operable when in said unlocked position to permit said slide to move rearwardly to said released position, said locking means engaging said slide and moving the slide from said released position to said coupling position when the slide is in said released position and said locking means is moved from said unlocked position to said locked position, resilient means connected between said locking means and said support member and urging said locking means toward said locked position, and means for releasably holding said locking means in said unlocked position against the action of said resilient means and operable in response to rearward movement of said slide to said released position to automatically release said locking means for movement to said locked position under the urging of said resilient means whereby said locking means moves said slide forwardly to said coupling position.

8. Apparatus as defined in claim 7 in which said locking means comprises a transversely extending shaft rotatably mounted by said support member, and a rod rotatable with said shaft and offset from the axis thereof, said rod engaging the rear end of said slide member when said locking means is in said locked position.

9. Apparatus as defined in claim 8 in which said shaft is supported to slide transversely of said support member, said resilient means being connected between said support member and said shaft and urging said shaft to rotate in one angular direction and to slide in one transverse direction.

10. Apparatus as defined in claim 9 in which said holding means includes coacting means on said shaft and support member and releasably holding said shaft against rotating in said one angular direction and against sliding in said one transverse direction.

* * * * *